United States Patent
Saito et al.

(10) Patent No.: US 9,085,813 B2
(45) Date of Patent: Jul. 21, 2015

(54) METHOD FOR RECOVERING METALLIC LITHIUM

(75) Inventors: Yumiko Saito, Kanagawa (JP); Junpei Momo, Kanagawa (JP); Rie Matsubara, Kanagawa (JP); Hiroatsu Todoriki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 923 days.

(21) Appl. No.: 13/232,001

(22) Filed: Sep. 14, 2011

(65) Prior Publication Data

US 2012/0073984 A1    Mar. 29, 2012

(30) Foreign Application Priority Data

Sep. 23, 2010    (JP) ................. 2010-212916

(51) Int. Cl.
  *C25C 3/02*    (2006.01)
  *C22B 26/12*    (2006.01)
  *H01M 10/54*    (2006.01)

(52) U.S. Cl.
  CPC . *C22B 26/12* (2013.01); *C25C 3/02* (2013.01); *H01M 10/54* (2013.01)

(58) Field of Classification Search
  USPC .................................. 205/406–408
  See application file for complete search history.

(56) References Cited

U.S. PATENT DOCUMENTS

| | | | |
|---|---|---|---|
| 4,781,756 A * | 11/1988 | Frianeza-Kullberg et al. | 75/745 |
| 7,175,937 B2 | 2/2007 | Cho et al. | |
| 8,911,610 B2 | 12/2014 | Nakamura et al. | |
| 2010/0051470 A1 * | 3/2010 | Nakamura et al. | 205/407 |
| 2013/0001097 A1 | 1/2013 | Nakamura et al. | |

FOREIGN PATENT DOCUMENTS

| | | |
|---|---|---|
| CN | 001494173 A | 5/2004 |
| CN | 001693512 A | 11/2005 |
| CN | 101573296 A | 11/2009 |
| CN | 101654741 A | 2/2010 |
| CN | 101760759 A | 6/2010 |
| JP | 06-251805 | 9/1994 |
| JP | 08-031431 A | 2/1996 |
| JP | 11-240716 | 9/1999 |

(Continued)

OTHER PUBLICATIONS

Di.X et al., "Comparative Analysis of Productive Technology for Metallic Lithium", Journal of Salt Lake Research, Jun. 1, 2005, vol. 13, No. 2, pp. 45-52.

(Continued)

*Primary Examiner* — Arun S Phasge
(74) *Attorney, Agent, or Firm* — Nixon Peabody LLP; Jeffrey L. Costellia

(57) ABSTRACT

An object is to recover metallic lithium from metallic lithium on which an unnecessary substance is formed without discarding the metallic lithium on which an unnecessary substance is formed. The present invention relates to a method for recovering metallic lithium in such a manner that metallic lithium on which a substance is formed is reacted with nitrogen to form lithium nitride; the lithium nitride is reacted with carbon dioxide to form lithium carbonate; the lithium carbonate is reacted with hydrochloric acid to form lithium chloride; the lithium chloride and potassium chloride are melted; and electrolysis is applied to the melted lithium chloride and potassium chloride.

18 Claims, 1 Drawing Sheet

(56) References Cited

FOREIGN PATENT DOCUMENTS

| | | |
|---|---|---|
| JP | 2001-048504 | 2/2001 |
| JP | 2001-328803 A | 11/2001 |
| JP | 2002-167626 | 6/2002 |
| JP | 2005-026088 A | 1/2005 |
| JP | 2009-097024 A | 5/2009 |
| WO | WO-2008/053986 | 5/2008 |

OTHER PUBLICATIONS

Chinese Office Action (Application No. 201110296543.9) Dated May 13, 2014.

* cited by examiner

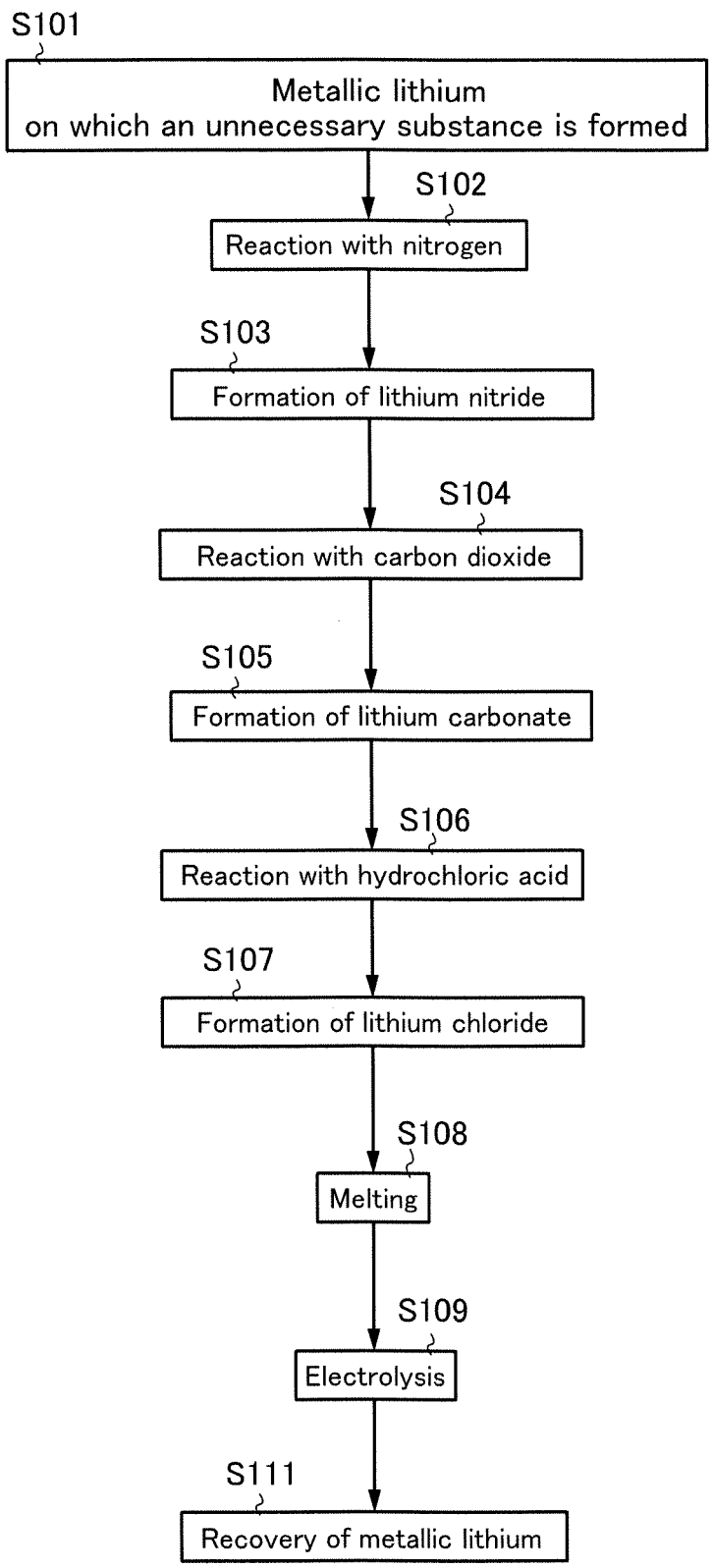

METHOD FOR RECOVERING METALLIC LITHIUM

BACKGROUND OF THE INVENTION

1. Field of the Invention

One embodiment of the disclosed invention relates to a method for recovering metallic lithium.

2. Description of the Related Art

In recent years, demand for lithium has been increasing in a variety of fields including ceramics, batteries, and medicines.

For example, lithium is used for a positive electrode, a negative electrode, and an electrolyte of a lithium secondary battery. In particular, metallic lithium is used for the formation of a negative electrode active material (see Patent Document 1).

Lithium which is a metal at ordinary temperatures and pressure, is a rare metal, which means that production of lithium is small around the world and lithium-producing areas are unevenly distributed. Thus, there is country risk with using lithium as raw materials of industrial products. At the same time, the present situation is that a technique to recover and recycle lithium used as an addition agent of glass and raw materials of a secondary battery is not established yet.

REFERENCE

Patent Document

[Patent Document 1] Japanese Published Patent Application No. H06-251805

SUMMARY OF THE INVENTION

Metallic lithium is highly reactive, and a substance is formed on its surface when the metallic lithium is put in the air at ordinary temperatures. For example, when metallic lithium reacts with nitrogen in the air, lithium nitride is formed on a surface of the metallic lithium. When metallic lithium reacts with moisture in the air, lithium hydroxide is formed on a surface of the metallic lithium.

In the case where the above-described metallic lithium on which a substance is formed is used as a material of a negative electrode active material without being processed, reactivity with an electrolyte may be bad, and thus a lithium ion secondary battery may have inferior characteristics.

Thus, as described above, the metallic lithium on which an unnecessary substance is formed is useless and is discarded after deactivation treatment with ethanol or water.

However, it is preferable to recover metallic lithium because it is useful in industry as described above.

In view of the above, in one embodiment of the disclosed invention, it is an object not to discard metallic lithium on which an unnecessary substance is formed and to recover metallic lithium from the metallic lithium on which an unnecessary substance is formed.

In one embodiment of the disclosed invention, metallic lithium on which an unnecessary substance is formed is reacted with nitrogen to form lithium nitride; the lithium nitride is reacted with carbon dioxide to form lithium carbonate; the lithium carbonate is reacted with hydrochloric acid to form lithium chloride; and lithium chloride is melted and electrolyzed. The melting point of lithium chloride is 613° C.; however, a mixture of lithium chloride and potassium chloride melts at 450° C.; thus, the mixture of lithium chloride and potassium chloride is preferably melted. Note that a substance which is mixed with lithium chloride is not limited to potassium chloride as long as the melting point is lowered by mixing the substance with the lithium chloride. Instead of using potassium chloride, sodium chloride may be used. Metallic lithium can be recovered by the electrolysis.

One embodiment of the disclosed invention relates to a method for recovering metallic lithium in the following manner: metallic lithium on which a substance is formed is reacted with nitrogen to form lithium nitride; the lithium nitride is reacted with carbon dioxide to form lithium carbonate; the lithium carbonate is reacted with hydrochloric acid to form lithium chloride; and the lithium chloride and potassium chloride are melted and then electrolyzed.

In one embodiment of the disclosed invention, liquid nitrogen is injected into a container, a porous material is set on the top of the container into which the liquid nitrogen is injected, metallic lithium on which an unnecessary substance is formed is placed on the porous material, the metallic lithium is reacted with nitrogen produced from the liquid nitrogen, so that lithium nitride is formed.

According to one embodiment of the disclosed invention, metallic lithium on which an unnecessary substance is formed is not discarded and metallic lithium can be recovered from the metallic lithium on which an unnecessary substance is formed. When metallic lithium is recovered from the metallic lithium on which an unnecessary substance is formed, metallic lithium, which is reactive, can be recovered after being made comparatively stable lithium nitride. Thus, recovery operations become easy.

BRIEF DESCRIPTION OF THE DRAWINGS

FIG. 1 is a flow chart illustrating a method for recovering lithium.

DETAILED DESCRIPTION OF THE INVENTION

An embodiment of the invention disclosed in this specification will be hereinafter described with reference to the accompanying drawing. Note that the invention disclosed in this specification can be carried out in a variety of different modes, and it is easily understood by those skilled in the art that the mode and details of the invention disclosed in this specification can be changed in various ways without departing from the spirit and scope thereof. Therefore, the present invention is not construed as being limited to description of the embodiment. Note that, in the drawing hereinafter shown, the same portions or portions having similar functions are denoted by the same reference numerals, and repeated description thereof will be omitted.

A method for recovering metallic lithium of this embodiment will be described with reference to FIG. 1.

Metallic lithium on which an unnecessary substance is formed (S101) is reacted with nitrogen (S102) to form lithium nitride (S103). The unnecessary substance which is formed on the metallic lithium is lithium hydroxide that is formed by reaction of the metallic lithium and moisture in the air, lithium nitride that is formed by reaction of the metallic lithium and nitrogen in the air, or the like. In that process, metallic lithium which reacts with nitrogen is part of the metallic lithium on which an unnecessary substance is formed, which has not reacted with nitrogen, moisture, or the like in the air.

Note that in this embodiment, as the metallic lithium, foil-like metallic lithium (metallic lithium foil), spherical metallic lithium, plate-like metallic lithium, or the like is used.

A method for forming lithium nitride in such a manner that part of metallic lithium on which an unnecessary substance is formed, which has not reacted is reacted with nitrogen will be described in detail below.

For example, metallic lithium on which an unnecessary substance is formed is placed in a glove box or the like with a nitrogen atmosphere which does not contain moisture and oxygen. Next, lithium nitride is formed in such a manner that part of metallic lithium on which an unnecessary substance is formed, which has not reacted is reacted with nitrogen while the glove box is ventilated with a nitrogen gas. At that time, it is preferable to perform treatment such as treatment to give distortion to the metallic lithium on which an unnecessary substance is formed by applying pressure to the metallic lithium or treatment to locally heat the surface of the metallic lithium on which an unnecessary substance is formed because metallic lithium which has not reacted easily reacts with nitrogen.

First, a container in which liquid nitrogen is put is prepared, and liquid nitrogen is injected into the container. A porous material through which a nitrogen gas can pass is set on the top of the container. Metallic lithium on which an unnecessary substance is formed is placed on the porous material. A nitrogen gas is produced from the liquid nitrogen in the container. The nitrogen gas produced from the liquid nitrogen passes through the porous material and reacts with part of the metallic lithium on which an unnecessary substance is formed, which has not reacted. When the metallic lithium which has not reacted reacts with the nitrogen gas, lithium nitride is formed. In the above described manner, lithium nitride can be obtained.

Then, the obtained lithium nitride is reacted with carbon dioxide (S104). By the reaction of lithium nitride with carbon dioxide, lithium carbonate (S105) is formed.

The reaction of the lithium nitride with carbon dioxide may be performed in a glove box as in the case where the metallic lithium on which an unnecessary substance is formed is reacted with nitrogen, or may be performed in a container including a porous material.

In the case where the reaction of lithium nitride with carbon dioxide is performed in a glove box, lithium nitride is placed in the glove box with a carbon dioxide atmosphere first. Next, the lithium nitride is reacted with carbon dioxide while the glove box is ventilated with a carbon dioxide gas, so that lithium carbonate is formed.

Alternatively, lithium nitride may be reacted with carbon dioxide using the above-described container and the porous material. In that case, the process may be performed in a manner similar to the manner in which the metallic lithium on which an unnecessary substance is formed is reacted with nitrogen. In this case, dry ice is used instead of liquid nitrogen, and lithium nitride may be reacted with carbon dioxide generated from the dry ice. The lithium nitride reacts with the carbon dioxide generated from the dry ice, so that lithium carbonate is formed.

Then, the obtained lithium carbonate is reacted with hydrochloric acid (S106), so that lithium chloride is formed (S107).

Then, the lithium chloride is melted (S108) and then electrolyzed (S109). The melting point of lithium chloride is 613° C.; however, a mixture of lithium chloride and potassium chloride melts at 450° C. Thus, it is preferable to melt the mixture of lithium chloride and potassium chloride. Note that a substance which is mixed with lithium chloride is not limited to potassium chloride as long as the melting point is lowered by mixing the substance with the lithium chloride. Instead of using potassium chloride, for example, sodium chloride may be used. By the electrolysis, metallic lithium can be recovered (S111).

Through the above steps, metallic lithium can be recovered from the metallic lithium on which an unnecessary substance is formed. The recovered metallic lithium is rolled out using a roller or the like, whereby metallic lithium foil can be formed. Alternatively, the obtained metallic lithium can be used for other applications. In either case, according to this embodiment, metallic lithium can be recovered from the metallic lithium on which an unnecessary substance is formed.

According to this embodiment, metallic lithium on which an unnecessary substance is formed is not discarded and metallic lithium can be recovered from the metallic lithium on which an unnecessary substance is formed.

This application is based on Japanese Patent Application serial no. 2010-212916 filed with the Japan Patent Office on Sep. 23, 2010, the entire contents of which are hereby incorporated by reference.

What is claimed is:

1. A method for recovering metallic lithium, comprising the steps of:
   forming lithium nitride by a reaction of metallic lithium on which a substance is formed with nitrogen;
   forming lithium carbonate by a reaction of the lithium nitride with carbon dioxide;
   forming lithium chloride by a reaction of the lithium carbonate with hydrochloric acid;
   melting the lithium chloride; and
   recovering metallic lithium by applying electrolysis to the melted lithium chloride.

2. The method for recovering metallic lithium, according to claim 1, wherein lithium hydroxide is formed on a part of a surface of the metallic lithium before the step of forming lithium nitride.

3. The method for recovering metallic lithium, according to claim 1, wherein the metallic lithium is distorted by applying pressure at the step of forming lithium nitride.

4. The method for recovering metallic lithium, according to claim 1, wherein a surface of the metallic lithium is locally heated at the step of forming lithium nitride.

5. The method for recovering metallic lithium, according to claim 1, further comprising the step of forming metallic foil by rolling out the recovered metallic lithium.

6. The method for recovering metallic lithium, according to claim 1,
   wherein the metallic lithium is reacted with nitrogen produced from liquid nitrogen in a container, and
   wherein the metallic lithium is placed on a porous material set on a top of the container.

7. A method for recovering metallic lithium, comprising the steps of:
   forming lithium nitride by a reaction of metallic lithium on which a substance is formed with nitrogen;
   forming lithium carbonate by a reaction of the lithium nitride with carbon dioxide;
   forming lithium chloride by a reaction of the lithium carbonate with hydrochloric acid;
   melting potassium chloride and the lithium chloride; and
   recovering metallic lithium by applying electrolysis to the melted lithium chloride and potassium chloride.

8. The method for recovering metallic lithium, according to claim 7, wherein lithium hydroxide is formed on a part of a surface of the metallic lithium before the step of forming lithium nitride.

9. The method for recovering metallic lithium, according to claim 7, wherein the metallic lithium is distorted by applying pressure at the step of forming lithium nitride.

10. The method for recovering metallic lithium, according to claim 7, wherein a surface of the metallic lithium is locally heated at the step of forming lithium nitride.

11. The method for recovering metallic lithium, according to claim 7, further comprising the step of forming metallic foil by rolling out the recovered metallic lithium.

12. The method for recovering metallic lithium, according to claim 7,
wherein the metallic lithium is reacted with nitrogen produced from liquid nitrogen in a container, and
wherein the metallic lithium is placed on a porous material set on a top of the container.

13. A method for recovering metallic lithium, comprising the steps of:
forming lithium nitride by a reaction of metallic lithium on which a substance is formed with nitrogen;
forming lithium carbonate by a reaction of the lithium nitride with carbon dioxide;
forming lithium chloride by a reaction of the lithium carbonate with hydrochloric acid;
melting sodium chloride and the lithium chloride; and
recovering metallic lithium by applying electrolysis to the melted lithium chloride and sodium chloride.

14. The method for recovering metallic lithium, according to claim 13, wherein lithium hydroxide is formed on a part of a surface of the metallic lithium before the step of forming lithium nitride.

15. The method for recovering metallic lithium, according to claim 13, wherein the metallic lithium is distorted by applying pressure at the step of forming lithium nitride.

16. The method for recovering metallic lithium, according to claim 13, wherein a surface of the metallic lithium is locally heated at the step of forming lithium nitride.

17. The method for recovering metallic lithium, according to claim 13, further comprising the step of forming metallic foil by rolling out the recovered metallic lithium.

18. The method for recovering metallic lithium, according to claim 13,
wherein the metallic lithium is reacted with nitrogen produced from liquid nitrogen in a container, and
wherein the metallic lithium is placed on a porous material set on a top of the container.

* * * * *